(12) United States Patent
Sasaki

(10) Patent No.: US 12,391,250 B2
(45) Date of Patent: Aug. 19, 2025

(54) CONTROLLER AND CONTROL METHOD FOR CRUISE CONTROL PROCESS OF VEHICLE

(71) Applicant: TOYOTA JIDOSHA KABUSHIKI KAISHA, Toyota (JP)

(72) Inventor: Katsuya Sasaki, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 214 days.

(21) Appl. No.: 18/323,713

(22) Filed: May 25, 2023

(65) Prior Publication Data

US 2023/0382376 A1 Nov. 30, 2023

(30) Foreign Application Priority Data

May 30, 2022 (JP) .................. 2022-087733

(51) Int. Cl.
*B60W 30/14* (2006.01)
*B60W 40/06* (2012.01)

(52) U.S. Cl.
CPC .......... *B60W 30/143* (2013.01); *B60W 40/06* (2013.01); *B60W 2540/10* (2013.01)

(58) Field of Classification Search
CPC .. B60W 30/143; B60W 40/06; B60W 40/076; B60W 2540/10; B60W 2540/12; B60W 2520/10; B60W 2520/105; B60W 2552/15; B60W 2720/106
USPC .......................................................... 701/93
See application file for complete search history.

(56) References Cited

U.S. PATENT DOCUMENTS

| 9,096,229 | B2 * | 8/2015 | Eriksson | B60W 10/06 |
| 11,577,728 | B2 * | 2/2023 | Arai | B60W 30/18109 |
| 2003/0158648 | A1 * | 8/2003 | Kubota | B60K 31/0008 |
| | | | | 123/352 |
| 2004/0128057 | A1 | 7/2004 | Kitazawa et al. | |
| 2015/0175158 | A1 * | 6/2015 | Wagner | B60W 30/00 |
| | | | | 701/1 |
| 2018/0118207 | A1 * | 5/2018 | Ishiguro | B60W 50/0097 |

(Continued)

FOREIGN PATENT DOCUMENTS

| JP | 2004-050904 A | 2/2004 |
| JP | 2017-193334 A | 10/2017 |
| JP | 2018-135042 A | 8/2018 |

*Primary Examiner* — Andrew R Dyer
(74) *Attorney, Agent, or Firm* — Finnegan, Henderson, Farabow, Garrett and Dunner, LLP

(57) ABSTRACT

A vehicle includes an accelerator sensor, a vehicle speed sensor, and a gradient sensor. A controller for the vehicle is configured to execute a calculating process that calculates a traveling driving force required to move the vehicle forward based on a vehicle speed and an operation amount of an accelerator pedal, and a cruise control process that controls the vehicle speed such that the vehicle speed becomes a constant target vehicle speed. The controller is configured to execute the cruise control process on condition that a difference between a maximum value and a minimum value of the vehicle speed within a specified time period is less than or equal to a specified value, and a sum of a traveling resistance calculated based on the vehicle speed and a gradient resistance calculated based on the gradient of the road surface is greater than or equal to the traveling driving force.

10 Claims, 2 Drawing Sheets

(56) References Cited

U.S. PATENT DOCUMENTS

2021/0245746 A1* 8/2021 Arai ................. B60K 17/354
2023/0044965 A1* 2/2023 Whang ............... B60W 50/082

* cited by examiner

CONTROLLER AND CONTROL METHOD FOR CRUISE CONTROL PROCESS OF VEHICLE

BACKGROUND

1. Field

The present disclosure relates to a controller and a control method for a vehicle.

2. Description of Related Art

Japanese Laid-Open Patent Publication No. 2004-50904 discloses a controller capable of executing a so-called cruise control process. The controller executes the cruise control process when the vehicle is in a steady traveling state, in which the vehicle is traveling at a constant speed. Specifically, the controller determines whether a vehicle speed is within a certain range having a specified value, which is determined in advance, as a median, or whether an operation amount of an accelerator pedal is within a certain range having a specified value, which is determined in advance, as a median. Then, the controller executes the cruise control process when a state in which the determination result is affirmative continues for a specified time period. During execution of the cruise control process, the controller automatically controls the accelerator operation amount such that the difference between a target vehicle speed and the current vehicle speed decreases. That is, the controller controls the vehicle speed such that the vehicle speed becomes substantially constant during the cruise control process.

The controller described in the above-mentioned publication does not consider the influence of the gradient of the road surface on which the vehicle travels in determining whether the cruise control process should be executed. Therefore, even if the driver operates the accelerator pedal with the intention of keeping the vehicle speed constant, the cruise control process may not be executed.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a one general aspect, a controller for a vehicle is provided. The vehicle includes an accelerator sensor configured to detect an operation amount of an accelerator pedal, a vehicle speed sensor configured to detect a vehicle speed, and a gradient sensor configured to detect a gradient of a road surface on which the vehicle is travelling. The controller includes processing circuitry. The processing circuitry is configured to execute a calculating process that calculates a traveling driving force required to move the vehicle forward based on the vehicle speed and the operation amount of the accelerator pedal, and a cruise control process that controls the vehicle speed such that the vehicle speed becomes a constant target vehicle speed. The processing circuitry is configured to execute the cruise control process on condition that a difference between a maximum value and a minimum value of the vehicle speed within a specified time period, which is determined in advance, is less than or equal to a specified value, which is determined in advance, and a sum of a traveling resistance calculated based on the vehicle speed and a gradient resistance calculated based on the gradient of the road surface is greater than or equal to the traveling driving force.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, except for operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

A vehicle 500 equipped with a controller 100 according to one embodiment will now be described with reference to the drawings.

<Schematic Structure of Vehicle>

Figure 1:
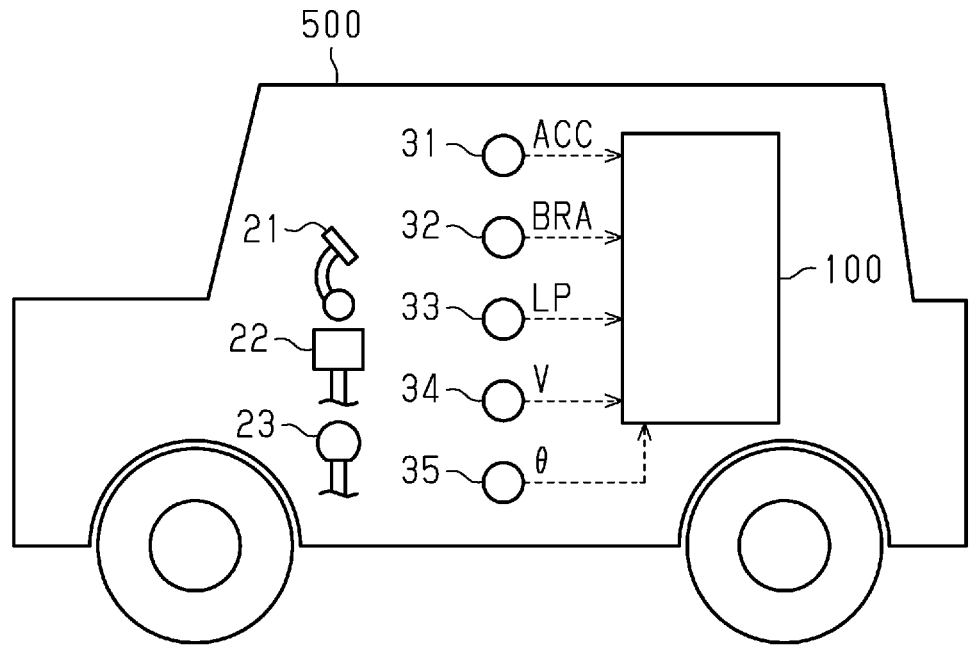
FIG. 1 shows a schematic configuration of a vehicle.

As shown in FIG. 1, the vehicle 500 includes an accelerator pedal 21, a brake pedal 22, and a shift lever 23. The accelerator pedal 21 is a foot pedal for controlling acceleration of the vehicle 500. The brake pedal 22 is a foot pedal for operating a brake device in order to decelerate the vehicle 500. In FIG. 1, the brake device is not shown. The brake device is, for example, a disc brake device.

The shift lever 23 is a lever for switching a traveling state of the vehicle 500. The shift lever 23 is switched by a driver of the vehicle 500. The traveling state of the vehicle 500 that can be switched with the shift lever 23 is any one of parking, neutral, low gear, drive, and reverse. When the traveling state of the vehicle 500 is set to parking or neutral with the shift lever 23, a non-traveling gear ratio is selected. When the traveling state of the vehicle 500 is low gear, drive, or reverse, a traveling gear ratio is selected. In FIG. 1, illustration of a transmission for selecting a gear ratio is omitted.

When the vehicle 500 is in the traveling state for parking, the wheels of the vehicle 500 are locked against rotation. When the vehicle 500 is in the neutral traveling state, the driving force from the drive source such as the internal combustion engine is not transmitted to the wheels. When the vehicle 500 is in a low gear or drive traveling state, the driving force from the drive source such as an internal combustion engine is transmitted to the wheels, so that the vehicle 500 moves forward. However, when the vehicle 500 is in a low gear traveling state, the gear ratio of the transmission is limited to the gear ratio for the lowest speed. When the vehicle 500 is in a traveling state for drive, the gear ratio of the transmission is not limited. When the vehicle 500 is in the traveling state for reverse, the driving force from the drive source such as an internal combustion engine is transmitted to the wheels, so that the vehicle 500 moves backward.

The vehicle 500 includes an accelerator sensor 31, a brake sensor 32, a lever position sensor 33, a vehicle speed sensor 34, and a gradient sensor 35.

The accelerator sensor 31 detects an accelerator operation amount ACC, which is an operation amount of the accelerator pedal 21 operated by a driver of the vehicle 500. The accelerator operation amount ACC increases as the operation amount of the accelerator pedal 21 by the driver of the vehicle 500 increases. When the driver of the vehicle 500 is not operating the accelerator pedal 21, the accelerator operation amount ACC is zero.

The brake sensor 32 detects a brake operation amount BRA, which is an operation amount of the brake pedal 22 operated by the driver of the vehicle 500. The brake operation amount BRA increases as the operation amount of the brake pedal 22 by the driver of the vehicle 500 increases. When the driver of the vehicle 500 is not operating the brake pedal 22, the brake operation amount BRA is zero.

The lever position sensor 33 detects a lever position LP, which is an operation position of the shift lever 23 operated by the driver of the vehicle 500. The operation position of the shift lever 23 includes a parking position, a neutral position, a low gear position, a drive position, and a reverse position corresponding to the type of the traveling state of the vehicle 500.

The vehicle speed sensor 34 detects a vehicle speed V, which is the speed of the vehicle 500. The gradient sensor 35 detects an inclination angle θ of a longitudinal axis of the vehicle 500 with respect to a horizontal plane. Specifically, the gradient sensor 35 detects, for example, an upward gradient angle and a downward gradient angle. For example, the gradient sensor 35 detects an upward gradient angle as a positive inclination angle θ. The gradient sensor 35 detects a downward gradient angle as a negative inclination angle θ. That is, the gradient sensor 35 can detect the gradient of the road surface on which the vehicle 500 is traveling.

The vehicle 500 includes the controller 100.

The controller 100 obtains a signal indicating the accelerator operation amount ACC from the accelerator sensor 31. The controller 100 obtains a signal indicating the brake operation amount BRA from the brake sensor 32. The controller 100 obtains a signal indicating the lever position LP from the lever position sensor 33. The controller 100 obtains a signal indicating the vehicle speed V from the vehicle speed sensor 34. The controller 100 detects a signal indicating the inclination angle θ from the gradient sensor 35.

The controller 100 executes a calculating process of calculating a traveling driving force based on the accelerator operation amount ACC and the vehicle speed V. The traveling driving force is a force for moving the vehicle 500 forward. Specifically, the controller 100 calculates the traveling driving force as a greater value as the accelerator operation amount ACC increases. Further, the controller 100 calculates the traveling driving force as a greater value as the vehicle speed V increases.

The controller 100 calculates the traveling resistance. The traveling resistance is obtained by substituting values into Expression 1 below.

$$F = \mu \cdot g \cdot M + (1/2) \cdot \rho \cdot Cd \cdot S \cdot V^2 \qquad \text{Expression 1}$$

where F denotes the traveling resistance, μ denotes the rolling resistance, g denotes the gravitational acceleration, M denotes the vehicle mass, ρ denotes the air density, Cd denotes the air resistance coefficient, and S denotes the frontal projected area.

In the present embodiment, the rolling resistance μ and the air density ρ are each constant values that have been determined in advance. The gravitational acceleration G is 9.8 m/s². The vehicle mass M, the air resistance coefficient Cd, and the frontal projected area S are values unique to each vehicle 500.

The controller 100 calculates a gradient resistance. The gradient resistance is determined by substituting values into Expression 2 below. The gradient resistance is calculated as a positive value in a case of an upward gradient angle and as a negative value in a case of a downward gradient angle.

$$R = M \times g \times \sin\theta \qquad \text{(Expression 2)}$$

where R denotes the gradient resistance.

The controller 100 may include processing circuitry including one or more processors that execute various processes in accordance with a computer program (software). The controller 100 may include processing circuitry including one or more dedicated hardware circuits such as an application-specific integrated circuit (ASIC) that executes at least a part of various processes. Alternatively, the controller 100 may include processing circuitry including a combination of the processor and the dedicated hardware circuit. The processor includes a CPU and a memory such as a RAM and a ROM. The memory stores program codes or instructions configured to cause the CPU to execute processes. Memory or computer-readable media includes any available media that can be accessed by a general purpose or special purpose computer.

<Cruise Control Start Determination Control>

The controller 100 is capable of executing a cruise control start determination control. The controller 100 repeatedly executes the start determination control on condition that the brake operation amount BRA is zero and the cruise control process is not being executed.

Figure 2:
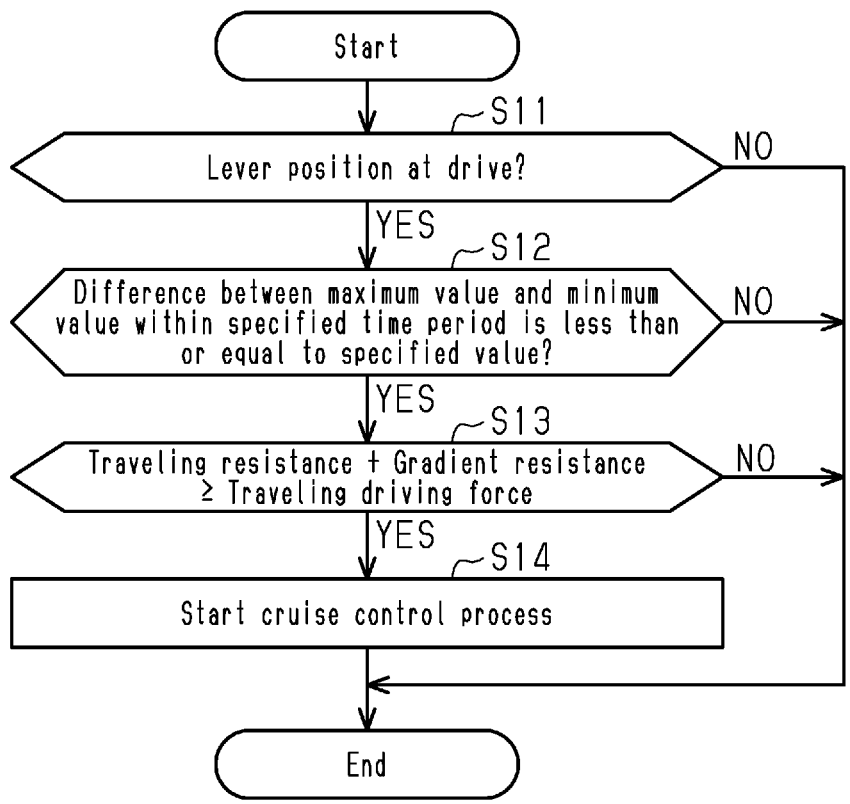
FIG. 2 is a flowchart of a start determination control executed by the controller shown in FIG. 1.

As shown in FIG. 2, when executing the start determination control, the controller 100 executes the process of step S11. In step S11, the controller 100 obtains the lever position LP. Then, the controller 100 determines whether the lever position LP is the drive position. When the result of the above determination is negative, the controller 100 ends the start determination control. When the result of the determination is affirmative, the process of the controller 100 proceeds to step S12.

In step S12, the controller 100 repeatedly obtains the vehicle speed V over a specific time period, which is determined in advance. Then, the controller 100 calculates a difference between a maximum value Vmax and a minimum value Vmin of the vehicle speed V within the specified time period. Subsequently, the controller 100 determines whether the difference between the maximum value Vmax and the minimum value Vmin is less than or equal to the specific value, which is determined in advance.

The specified time period is a time period sufficient for determining whether the driver of the vehicle 500 is driving to keep the vehicle speed V constant. The specified time period is set in advance to, for example, about several seconds to ten and several seconds. The specified value is set in advance as, for example, to 5 kilometers per hour. If a negative determination is made in step S12, the controller 100 ends the start determination control. When an affirmative determination is made in step S12, the processing of the controller 100 proceeds to step S13.

In step S13, the controller 100 calculates the traveling driving force. Further, the controller 100 calculates the traveling resistance and the gradient resistance. The methods for calculating traveling driving force, the traveling resistance, and the gradient resistance are as described above. Then, the controller 100 determines whether the sum of the traveling resistance and the gradient resistance is greater than or equal to the traveling driving force. If the result of the determination is negative, the controller 100 ends the start determination control. When the result of the determination is affirmative, the controller 100 proceeds to step S14.

In step S14, the controller 100 starts the cruise control process. Thereafter, the controller 100 ends the start determination control. Once the cruise control process is started, a series of processes of the start determination control for the cruise control process is not executed until the cruise control process is ended.

During execution of the cruise control process, the controller 100 automatically controls the accelerator operation amount ACC, the gear ratio, and the like so that the vehicle speed V becomes a constant target vehicle speed. The target vehicle speed is set, for example, to an average value of the maximum value Vmax of the vehicle speed V and the minimum value Vmin of the vehicle speed V obtained within the specified time period in step S12.

During execution of the cruise control process, the controller 100 determines whether the following termination condition of the cruise control process is met.

The lever position LP has been changed from the drive position to another position.

The brake operation amount BRA has a positive value.

The accelerator operation amount ACC is greater than zero, and the sum of the traveling resistance and the gradient resistance is less than the traveling driving force.

When at least one of the above three termination conditions is met, the controller 100 ends the currently executed cruise control process. Thus, the vehicle 500 travels at a vehicle speed V corresponding to the accelerator operation amount ACC and the like.

Operation of Present Embodiment

For example, it is assumed that the vehicle 500 enters a downhill road from a flat road. In this case, the vehicle 500 gradually accelerates due to the influence of gravity. It is now assumed that the driver of the vehicle 500 decreases the accelerator operation amount ACC in order to keep the vehicle speed V constant.

In the cruise control start determination control, when the determination results in step S11 to step S13 are affirmative, the controller 100 starts the cruise control process. That is, even when the driver of the vehicle 500 decreases the accelerator operation amount ACC, the controller 100 starts the cruise control process if the results of the above three determinations are affirmative.

Advantages of Present Embodiment (1) With the above-described embodiment, the controller 100 starts the cruise control process on condition that the sum of the traveling resistance and the gradient resistance is greater than or equal to the traveling driving force. In other words, the controller 100 executes the cruise control process in consideration of the gradient of the road surface on which the vehicle 500 is traveling.

When the sum of the traveling resistance and the gradient resistance is greater than or equal to the traveling driving force, the magnitude of the force acting in the direction of advancing the vehicle 500 forward is zero or negative. That is, the vehicle 500 is either traveling at a constant speed or decelerating. In this case, there is a high possibility that the driver of the vehicle 500 does not intend to accelerate. Therefore, even when the accelerator operation amount ACC by the driver is changed, the cruise control process can be executed if the vehicle speed V is substantially constant and there is a high possibility that the driver of the vehicle 500 does not intend to accelerate.

(2) With the above-described embodiment, in the cruise control process, the controller 100 sets the target vehicle speed to the average value of the maximum value Vmax of the vehicle speed V and the minimum value Vmin of the vehicle speed V obtained within the specified time period. That is, the vehicle 500 can travel at a vehicle speed V close to the vehicle speed intended by the driver of the vehicle 500.

(3) With the above-described embodiment, the controller 100 executes the cruise control start determination control on condition that the brake operation amount BRA is zero. When the brake operation amount BRA is zero, there is a high possibility that the driver of the vehicle 500 does not have an intention of deceleration. Therefore, it is possible to prevent the cruise control start determination control and the subsequent cruise control process from being executed despite the driver's intention of deceleration.

(4) With the above-described embodiment, during execution of the cruise control process, the controller 100 ends the currently executed cruise control process on condition that the accelerator operation amount ACC is greater than zero and the sum of the traveling resistance and the gradient resistance is less than the traveling driving force. When the above conditions are met, the magnitude of the force acting in the direction of advancing the vehicle 500 is positive. That is, the vehicle 500 is accelerating. In this case, there is a high possibility that the driver of the vehicle 500 intends to accelerate. Therefore, the above-described configuration ends the cruise control process when the driver of the vehicle 500 wants to accelerate.

Modifications

The above-described embodiment may be modified as follows. The above-described embodiment and the following modifications can be combined if the combined modifications remain technically consistent with each other.

Figure 3:
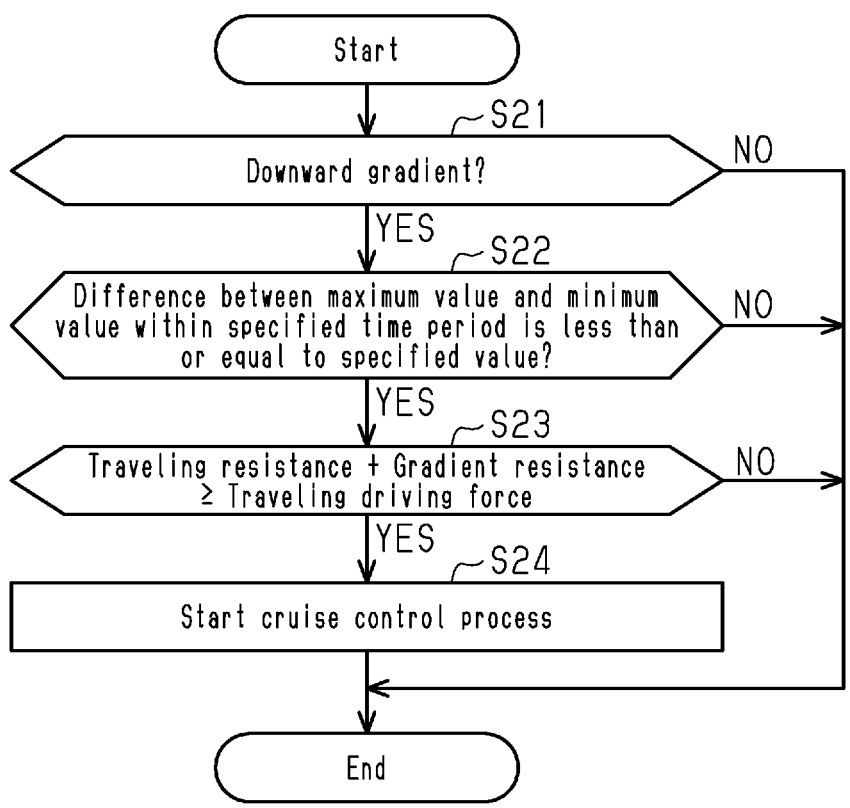
FIG. 3 is a flowchart of a start determination control executed by a controller according to a modification.

In the above-described embodiment, the controller 100 may omit the process of step S11 in the cruise control start determination control. In addition, in the cruise control start determination control, the controller 100 may execute another determination process instead of the process of step S11. For example, in the example shown in FIG. 3, when starting the cruise control start determination control, the controller 100 first executes the process shown in step S21 instead of the process in step S11 of the above-described embodiment. In step S21, the controller 100 determines whether the gradient detected by the gradient sensor 35 is a downward gradient. Specifically, the controller 100 detects the inclination angle θ from the gradient sensor 35. When the state in which the inclination angle θ is negative continues for a predetermined time period, the controller 100 determines that the gradient detected by the gradient sensor 35 is a downward gradient. When the determination result is affirmative, the process of the controller 100 proceeds to step S22. In the example shown in FIG. 3, the processes in steps S22 to S24 are the same as the processes in step S12 to S14 of the cruise control start determination control in the above-described embodiment.

According to the above-described configuration, the controller 100 is capable of executing the cruise control process in a case in which the vehicle 500 is traveling on a road surface having a downward gradient and the sum of the traveling resistance and the gradient resistance is greater than or equal to the traveling driving force. Also in this modification, the cruise control process can be executed in consideration of the gradient of the road surface on which the vehicle 500 is traveling, similarly to the advantage (1) described above.

In the above-described embodiment, the condition for ending the cruise control process is not limited to the example of the above-described embodiment. For example, in the above-described embodiment, the conditions for ending the cruise control process may include conditions other than the conditions described in the above-described embodiment, or some of the conditions described in the above-described embodiment may be omitted.

In the above-described embodiment, the condition for executing the cruise control start determination control does not necessarily need to include the condition that the brake operation amount BRA is zero. For example, the driver of the vehicle 500 operates the brake pedal 22 to keep the vehicle speed V constant in some cases. According to the above-described configuration, the cruise control start determination control can be executed even in this situation. In addition, the conditions for executing the cruise control start determination control may include conditions other than the conditions described in the above-described embodiment.

In the above-described embodiment, the value to which the target vehicle speed is set during the execution of the cruise control process is not limited to the example of the above-described embodiment. For example, the controller 100 may set the target vehicle speed to the maximum value Vmax of the vehicle speed V within the specified time period or the minimum value Vmin of the vehicle speed V within the specified time period. Further, the controller 100 may set the target vehicle speed to any vehicle speed V set by the driver of the vehicle 500.

The method of calculating the traveling resistance and the gradient resistance is not limited to the example of the above-described embodiment. For example, when calculating the traveling resistance, a rolling resistance μ and an air density ρ may be used as variables corresponding to the environment in which the vehicle 500 is traveling. The calculation formulas for calculating the traveling resistance and the gradient resistance are not limited to those in the above-described embodiment.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A control method for a vehicle, comprising:
   detecting an operation amount of an accelerator pedal;
   detecting a vehicle speed;
   detecting a gradient of a road surface on which the vehicle is travelling;
   executing a calculating process that calculates a traveling driving force required to move the vehicle forward based on the vehicle speed and the operation amount of the accelerator pedal;
   performing a first determination of determining that
      a difference between a maximum value and a minimum value of the vehicle speed within a predetermined time period, is less than or equal to a predetermined value, and
      a sum of a traveling resistance and a gradient resistance is greater than or equal to the traveling driving force, wherein the traveling resistance is calculated based on the vehicle speed and the gradient resistance is calculated based on the gradient of the road surface;
   executing a cruise control process that controls the vehicle speed such that the vehicle speed becomes a constant target vehicle speed based on the first determination;
   performing a second determination of determining that
      the operation amount of the accelerator pedal is greater than zero, and
      the sum of the traveling resistance and the gradient resistance is less than the traveling driving force; and
   ending the currently executed cruise control process based on the second determination.

2. A controller for a vehicle, wherein
   the vehicle includes:
      an accelerator sensor configured to detect an operation amount of an accelerator pedal;
      a vehicle speed sensor configured to detect a vehicle speed; and
      a gradient sensor configured to detect a gradient of a road surface on which the vehicle is travelling,
   the controller comprises processing circuitry,
   the processing circuitry is configured to execute
      a calculating process that calculates a traveling driving force required to move the vehicle forward based on the vehicle speed and the operation amount of the accelerator pedal; and
      a cruise control process that controls the vehicle speed such that the vehicle speed becomes a constant target vehicle speed,
   the processing circuitry is configured to execute the cruise control process on condition that
      a difference between a maximum value and a minimum value of the vehicle speed within a specified time period, which is determined in advance, is less than or equal to a specified value, which is determined in advance, and
      a sum of a traveling resistance and a gradient resistance is greater than or equal to the traveling driving force, wherein the traveling resistance is calculated based on the vehicle speed and the gradient resistance is calculated based on the gradient of the road surface, and
   the processing circuitry is configured to end the currently executed cruise control process on condition that the operation amount of the accelerator pedal is greater than zero, and the sum of the traveling resistance and the gradient resistance is less than the traveling driving force.

3. The controller for the vehicle according to claim 2, wherein the processing circuitry is further configured to execute the cruise control process on condition that the gradient detected by the gradient sensor is a downward gradient.

4. The controller for the vehicle according to claim 2, wherein the processing circuitry is further configured to set, in the cruise control process, the target vehicle speed to an average value of the maximum value and the minimum value of the vehicle speed obtained within the specified time period.

5. The controller for the vehicle according to claim 2, wherein the processing circuitry is further configured to execute the cruise control process on condition that an operation amount of a brake pedal is zero.

6. The controller for the vehicle according to claim 2, wherein the processing circuitry is further configured to set, in the cruise control process, the target vehicle speed to the maximum value of the vehicle speed obtained within the specified time period.

7. The controller for the vehicle according to claim 2, wherein the processing circuitry is further configured to set, in the cruise control process, the target vehicle speed to the minimum value of the vehicle speed obtained within the specified time period.

8. The controller for the vehicle according to claim 2, wherein the processing circuitry is further configured to set, in the cruise control process, the target vehicle speed to any speed selected by a driver of the vehicle.

9. The controller for the vehicle according to claim 2, wherein the traveling resistance is calculated based at least in part on a rolling resistance between tires of the vehicle and the road surface.

10. The controller for the vehicle according to claim 2, wherein the traveling resistance is calculated based at least in part on an air density of an environment in which the vehicle is traveling.

* * * * *